United States Patent [19]

Griffin

[11] Patent Number: 4,798,139
[45] Date of Patent: Jan. 17, 1989

[54] SOLENOID-OPERATED DEVICES
[75] Inventor: Dennis Griffin, Surrey, England
[73] Assignee: Frazer-Nash Limited, Kingston-upon-Thames, England
[21] Appl. No.: 559,039
[22] Filed: Nov. 25, 1983
[51] Int. Cl.[4] .............................................. F42C 15/24
[52] U.S. Cl. .................................. 102/216; 102/229; 102/244; 102/254
[58] Field of Search ............... 102/216, 229, 222, 244, 102/248, 254, 255

[56] References Cited

U.S. PATENT DOCUMENTS

| 2,710,578 | 6/1955 | Rabinow | 102/247 |
| 3,345,947 | 10/1967 | Combourieux | 102/248 |
| 3,720,165 | 3/1973 | Dinsmoor | 102/216 X |
| 3,951,036 | 4/1976 | Ramstad | 102/390 X |
| 3,976,011 | 8/1976 | Crescas et al. | 102/248 |
| 4,440,060 | 4/1984 | Berkley | 102/221 X |

Primary Examiner—Peter A. Nelson
Attorney, Agent, or Firm—Hall, Myers & Rose

[57] ABSTRACT

A solenoid-operated device, and especially a weapon-arming device, subject to inertial forces is provided in which the solenoid armature is operatively coupled to a counterbalancing mass operatively constrained to move in synchronism with but oppositely to the armature, inertial forces on the armature acting equally and oppositely on the counterbalancing mass. The counterbalancing mass surrounds the solenoid coaxially and has an annular extension provided internally with rack teeth that mesh with sprockets free to rotate on fixed pins, these sprockets also being in mesh with rack teeth on an extension of the armature. An armature retraction spring bears on a shoulder on the counterbalancing mass.

25 Claims, 1 Drawing Sheet

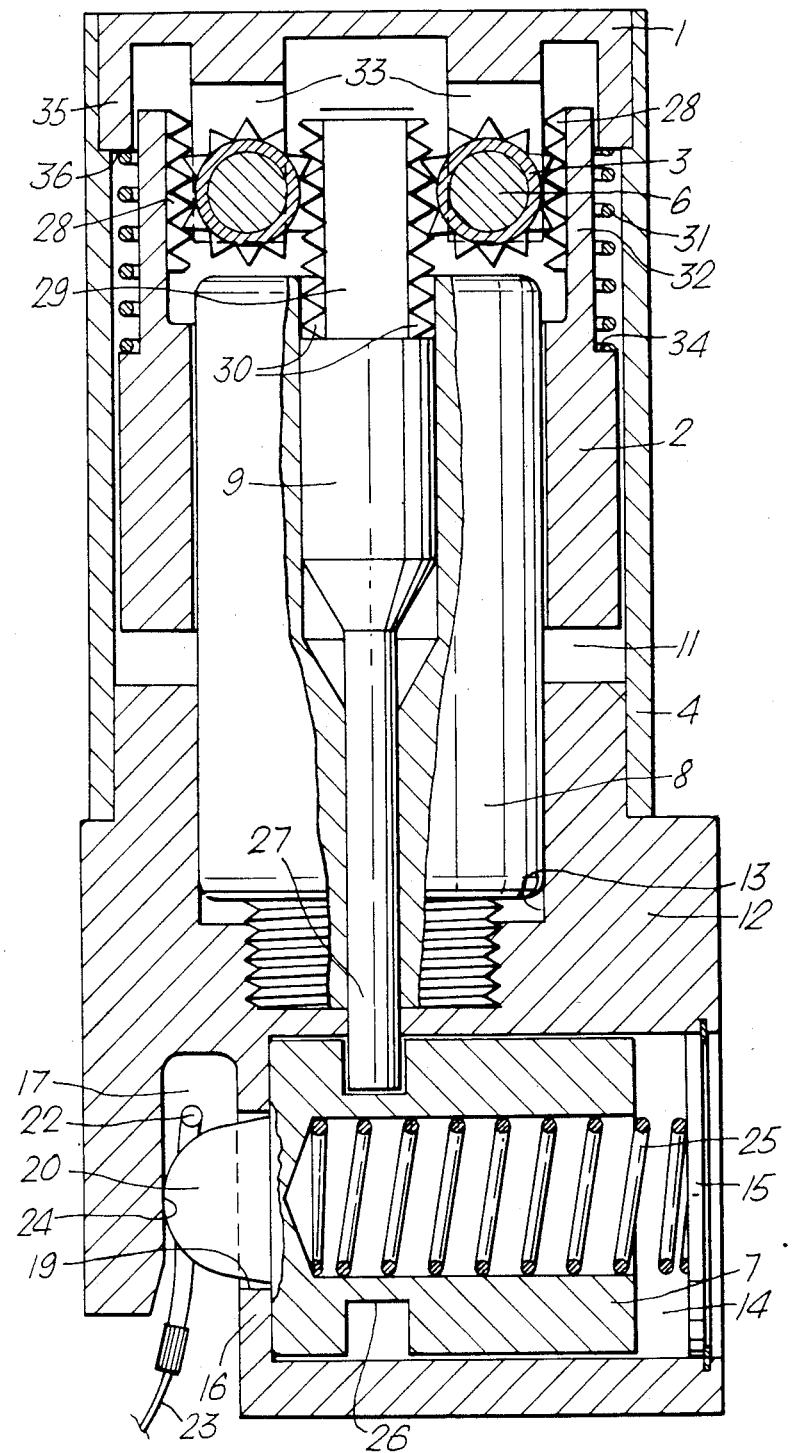

SOLENOID-OPERATED DEVICES

This invention relates to solenoid-operated devices subject to inertial forces, a particular example being arming, or fusing devices on airborne weapons. Such arming devices are designed to allow the weapon to be released from an aircraft either in a safe condition or in a "live" or armed condition, at the pilots command.

One arrangement that has been employed hitherto is known as a lanyard fusing unit. The lanyard is secured to the weapon at one end in the eye of a pin, and at the other end it is attached to an arming unit secured on part of the aircraft. If, when the weapon is launched, the arming unit is energised, it will retain the lanyard and the pin will be withdrawn from the weapon as it departs. But if the arming unit is not energised, the lanyard is snatched out of the arming unit as the weapon departs, so that the weapon is ejected in a safe condition.

Typically arming units have comprised a sprung plunger with a conical end abutting an anvil, and the lanyard is attached around the conical end and trapped between the sprung plunger and the anvil. The sprung plunger has around its perimeter a groove into which the spring-loaded armature of a solenoid engages when the solenoid is energised. By this means, when the solenoid is energised the sprung plunger is prevented from movement and the conical point remains in contact with the anvil ensuring the lanyard is not released. With the solenoid de-energised the armature is retracted so as to disengage from the sprung plunger, and in such event any snatch load on the lanyard will cause the lanyard to be released due to the movement of the sprung plunger.

The problem has been that in current aircraft where high vertical acceleration loads are achieved, the armature can be made to engage with the sprung plunger when the solenoid is de-energised due solely to inertial forces. Under these circumstances release of a weapon can occur in which the weapon is inadvertently made live. It is therefore an object of this invention to overcome this problem.

According to the present invention, there is provided a solenoid-operated device subject to inertial forces, comprising a solenoid having an armature mounted for rectilinear movement to and fro in the body of the device between operative and inoperative positions, a counterbalancing mass mounted for rectilinear movements to and fro along the same axis as the armature, and coupling connections between the armature and the counterbalancing mass such that when either moves the other is driven to move in synchronism but in the opposite direction.

In the preferred arrangement, the counter-balancing mass is of generally annular form and surrounds the solenoid coaxially. The armature is fitted with a gear tooth rack, a portion of the annular counter-weight is correspondingly internally toothed, and two or more gear wheels free to rotate about fixed pins are provided meshing, on the one hand, with the armature rack and, on the other hand, with the internal teeth on the counter-weight, so that the armature and the counter-weight are constrained to move equally in opposite axial directions. Therefore, any gravitational load on the armature is balanced by an equal oppositely-acting load on the counter-balance weight.

One construction in accordance with the invention will now be described, by way of example, with reference to the accompanying drawing, which shows an arming device, embodying the invention, in longitudinal section.

The arming device in the drawing has a casing consisting of an upright cylindrical upper part 4 and a block 12 fitted to the lower end of the cylindrical upper part. Housed within the cylindrical upper part 4 of the casing is a solenoid disposed with its axis vertical. The lower end of the cylindrical coil 8 of the solenoid is seated in a well 13 in the block 12, and between the upper part of the solenoid coil and the inside wall of the upper part 4 of the casing there is an annular cavity 11. The upper end of the cylindrical upper part 4 of the casing is closed by a closure plate 1.

Beneath the well 13, the lower block 12 of the casing has formed in it a cylinder chamber 14 with its axis horizontal, and within the cylinder chamber there is disposed a horizontally sliding plunger 7. The right hand end of the cylinder chamber 14, as seen in the drawing, is closed by an end cap 15 retained by a circlip, and at the left hand end the cylinder chamber is terminated by a wall 16 of the block 12, beyond which wall the block 12 is formed with a downwardly open slot 17. The wall 16 has a large aperture 19, coaxial with the cylinder axis, and through this aperture a rounded nose 20 on the plunger 7 protrudes into and across the slot 17. When the device is in use, a loop 22 on the end of the lanyard 23 extending from the weapon carried by the aircraft is received in the slot 17 and is trapped therein by the nose 20 on the plunger 7 passing through the lanyard loop and being urged against the slot wall 24 opposite the wall 16 by a plunger spring 25 which urges the plunger 7 toward the left in the drawing. In the drawing, the parts are shown in the positions they occupy when the solenoid is energised.

The plunger 7 is formed with an annular channel 26 in its outer circumferential wall. A rod portion 27 of the armature 9 extends downward below the coil 8 of the solenoid and through the block 12 to enter the cylinder chamber 14, where its lower end is received in the annular channel in the plunger 7 when the plunger is at the left hand end of its travel. This locks the plunger against movement to the right, and while the plunger is so locked, if the weapon leaves the aircraft the lanyard 23 will be retained by the plunger nose 20 and pulled away from the weapon as it leaves. However, if the solenoid is de-energised, the armature 9 moves upward under the influence of a spring 31 to be hereinafter further described, withdrawing the rod portion 27 from the annular channel 26 in the plunger 7, so that the pull on the lanyard as the weapon leaves the aircraft withdraws the lanyard loop from the slot 17 in the block 12 since the plunger 7 is able to move to the right against its spring loading to release the lanyard loop. To ensure that this happens, the spring loading on the plunger is quite light and the plunger nose 20 is so rounded that the lanyard loop can readily push the plunger back toward the right when the lanyard is tensioned.

In order to ensure that the armature 9 is not engaged in the plunger 7 unintentionally due to g-forces, an annular counter-balance weight 2 is provided in the cavity 11 between the solenoid 8 and the upper part 4 of the casing. This counter-balance weight has a portion 32 extending upward beyond the upper end of the solenoid, which portion is internally toothed, as at 28. The armature 9 also has a portion 29 extending upward beyond the upper end of the solenoid coil and this portion is formed as a rack with teeth 30. Between the internally toothed portion of the counter-balance weight 2 and the rack portion of the armature 9, there are one or more pairs of gears 3 mounted on pivot pins 6 borne by lugs 33 extending axially from the inner face of the closure plate 1. The gears 3 mesh, on the one hand, with the rack portion 29 of the armature and, on the other hand, with the internal teeth 28 on the counter-balance weight, with the result that if the armature moves upward the counter-balance weight must move downward by an equal amount and vice versa. Consequently, any g-force tending to move the armature 9 axially in the casing is counter-balanced by an oppositely-acting g-force on the counter-balance weight 2. The masses of the armature and the counter-balance weight are matched so that there is no resulting movement.

The upwardly-extending portion 32 of the counter-balance weight 2 is of somewhat reduced external diameter thereby forming an annular shoulder 34, and the closure plate 1 of the casing has an axial peripheral flange 35 fitted inside the upper end of the part 4 of the casing and of an internal diameter less than that of the casing part 4 thus forming a further shoulder 36 spaced from and facing the shoulder 34. The spring 31 previously referred to for withdrawing the armature 9 from the plunger 7 is a coil compression spring located between the shoulders 34, 36 and thereby acts on the armature by bearing on the counter-weight 2.

Although in the embodiment shown, the plunger 7 and the nose 20 retaining the lanyard loop are one integral member, it may, in practice, be found better to have a flat-faced plunger bearing on a separate ball that performs the function of the nose 20.

I claim:

1. A solenoid-operated device subject to inertial forces, comprising a solenoid having an armature mounted for rectilinear movement to and fro in the body of the device between operative and inoperative positions, a counterbalancing mass mounted for rectilinear movements to and fro along the same axis as the armature, and coupling connections between the armature and the counterbalancing mass such that when either moves the other is driven to move in synchronism but in the opposite direction.

2. A device according to claim 1, wherein the counterbalancing mass is of generally annular form and surrounds the solenoid coaxially.

3. A device according to claim 2, wherein the coupling connections comprise a set of rack teeth on the armature and a set of rack teeth on the counterbalancing mass, and gear wheels mounted to rotate about fixed axes in the body of the device and each in mesh with both sets of rack teeth.

4. A device according to claim 3, wherein the armature has an extension bearing the armature rack teeth, and the counterbalancing mass has an annular extension surrounding the armature extension and bearing the rack teeth of the counterbalancing mass internally.

5. A device according to claim 3, wherein a spring for retracting the armature bears on a shoulder on the counterbalancing mass.

6. A device according to claim 5, wherein the rectilinear movements of the armature cause it to engage in and retract from a side recess in a plunger mounted to move to and fro along an axis at right angles to the armature axis, whereby the plunger is locked and unlocked.

7. A device according to claim 3, wherein a spring for retracting the armature bears on a shoulder on the counterbalancing mass.

8. A weapon-arming device according to claim 6 wherein the plunger retains or releases a fusing lanyard according to whether it is locked or unlocked by the armature.

9. A device according to claim 1 wherein the coupling connections comprise a set of rack teeth on the armature and a set of rack teeth on the counterbalancing mass, and gear wheels mounted to rotate about fixed axes in the body of the device and each in mesh with both sets of rack teeth.

10. A device according to claim 9 wherein the armature has an extension bearing the armature rack teeth, and the counterbalancing mass has an annular extension surrounding the armature extension and bearing the rack teeth of the counterbalancing mass internally.

11. A device according to claim 10 wherein a spring for retracting the armature bears on a shoulder on the counterbalancing mass.

12. A device according to claim 11 wherein the rectilinear movements of the armature cause it to engage in and retract from a side recess in a plunger mounted to move to and fro along an axis at right angles to the armature axis, whereby the plunger is locked and unlocked.

13. A device according to claim 1 wherein a spring for retracting the armature bears on a shoulder on the counterbalancing mass.

14. A device according to claim 13 wherein the rectilinear movements of the armature cause it to engage in and retract from a side recess in a plunger mounted to move to and fro along an axis at right angles to the armature axis, whereby the plunger is locked and unlocked.

15. A device according to claim 2 wherein a spring for retracting the armature bears on a shoulder on the counterbalancing mass.

16. A device according to claim 15 wherein the rectilinear movements of the armature cause it to engage in and retract from a side recess in a plunger mounted to move to and fro along an axis at right angles to the armature axis, whereby the plunger is locked and unlocked.

17. A device according to claim 7 wherein the rectilinear movements of the armature cause it to engage in and retract from a side recess in a plunger mounted to move to and fro along an axis at right angles to the armature axis, whereby the plunger is locked and unlocked.

18. A device according to claim 2 wherein the armature has an extension bearing the armature rack teeth, and the counterbalancing mass has an annular extension surrounding the armature extension and bearing the rack teeth of the counterbalancing mass internally.

19. A device according to claim 9 wherein a spring for retracting the armature bears on a shoulder on the counterbalancing mass.

20. A device according to claim 19 wherein the rectilinear movements of the armature cause it to engage in and retract from a side recess in a plunger mounted to move to and fro along an axis at right angles to the armature axis, whereby the plunger is locked and unlocked.

21. A weapon-arming device according to claim 12 wherein the plunger retains or releases a fusing lanyard according to whether it is locked or unlocked by the armature.

22. A weapon-arming device according to claim 14 wherein the plunger retains or releases a fusing lanyard according to whether it is locked or unlocked by the armature.

23. A weapon-arming device according to claim 16 wherein the plunger retains or releases a fusing lanyard according to whether it is locked or unlocked by the armature.

24. A weapon-arming device according to claim 17 wherein the plunger retains or releases a fusing lanyard according to whether it is locked or unlocked by the armature.

25. A weapon-arming device according to claim 20 wherein the plunger retains or releases a fusing lanyard according to whether it is locked or unlocked by the armature.

* * * * *